C. RYAN.
NUT LOCK.
APPLICATION FILED JULY 7, 1911.
1,016,897.
Patented Feb. 6, 1912.
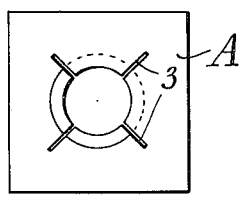
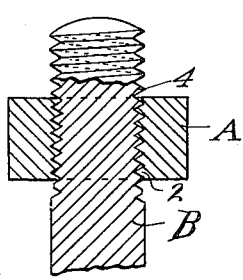
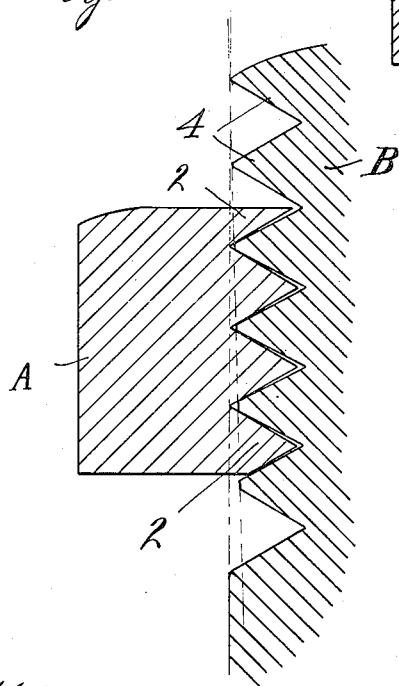
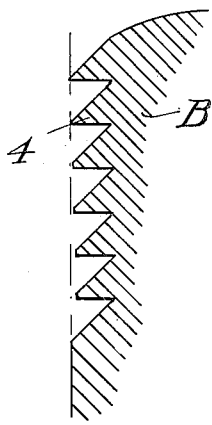
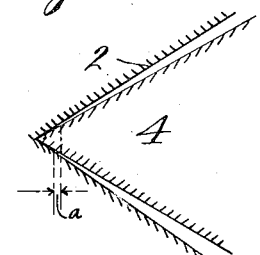
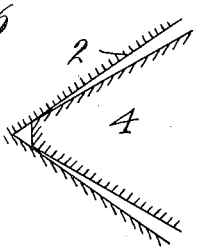
Witnesses,
George Voelker
A. S. Johnson
Inventor,
Catherine Ryan
by Lothrop & Johnson
her Attorneys.

UNITED STATES PATENT OFFICE.

CATHERINE RYAN, OF ST. PAUL, MINNESOTA.

NUT-LOCK.

1,016,897. Specification of Letters Patent. Patented Feb. 6, 1912.

Application filed July 7, 1911. Serial No. 637,390.

*To all whom it may concern:*

Be it known that I, CATHERINE RYAN, a citizen of the United States, residing at St. Paul, in the county of Ramsey and State of Minnesota, have invented certain new and useful Improvements in Nut-Locks, of which the following is a specification.

My invention relates to improvements in nut locks, its object being to provide improved means for preventing a nut from becoming loose from a bolt.

To this end my invention consists of the particular features of construction and combination hereinafter particularly described and claimed.

In the accompanying drawings forming a part of this specification Figure 1 is a plan view of a nut forming part of my invention. Fig. 2 is a section of the bolt and nut shown in Fig. 1 showing the bolt partly in elevation. Fig. 3 is a similar section partly broken away and enlarged. Fig. 4 is a longitudinal section showing the nut and bolt partly broken away and showing a modified form of thread and Figs. 5 and 6 are conventional views of the coöperating threads of a bolt and nut embodying my invention.

Referring to the drawings A represents a nut having an interior thread 2 and formed with slots 3 radiating from the central opening of the nut.

B represents the bolt formed with a surrounding thread 4 upon its end, the groove formed by the thread of the bolt being deeper than the groove formed by the thread 2 of the nut. The top of the thread 3 of the bolt is cut off a gradually increasing amount toward the inner end of the bolt as indicated by the dot and dash lines of Fig. 3. The nut is so proportioned to the bolt as to spread while being screwed over the outer end of the bolt, this spread being permitted by the radiating slots 3. The groove formed by the thread of the nut being shallower than the groove formed by the thread of the bolt, and the bolt thread having its top cut off an increasing amount toward the inner end of the bolt, will allow the nut thread to gradually sink into the bolt thread groove by the contracting spring action of the nut, as illustrated particularly by Fig. 3 and the conventional views 5 and 6. Thus as the nut reaches the inner end of the bolt thread, the nut will hold contracted upon the bolt to a maximum degree. To then remove the nut from the bolt will necessitate the nut spreading outwardly and the nut is thus held effectively upon the bolt against accidental displacement.

The slots 3 in the nut relatively weaken the nut at their point and permit it to spread in being forced over the end of the bolt, the nut, after being forced over the end of the bolt, contracting upon the bolt threads which are cut away an increasing amount toward the inner end of the bolt for that purpose.

I claim—

1. In combination a threaded bolt and an expansible threaded nut, the groove formed by the nut thread being shallower than the groove formed by the bolt thread, and the bolt thread having its top cut off an increasing amount from the outer and toward its inner end.

2. In combination a threaded bolt and a threaded expansible nut, the top of the bolt thread being cut off an increasing amount from its outer and toward the inner end of the bolt, for the purpose set forth.

In testimony whereof I affix my signature in presence of two witnesses.

CATHERINE RYAN.

Witnesses:
 H. S. JOHNSON,
 GEORGE VOELKER.